Feb. 5, 1952    F. P. WILLCOX    2,584,406
EXPOSURE METER DIAL STRUCTURE
Original Filed Dec. 16, 1944

Frederick P. Willcox
By: Homer R. Montague
ATTY.

Patented Feb. 5, 1952

2,584,406

UNITED STATES PATENT OFFICE 2,584,406

EXPOSURE METER DIAL STRUCTURE

Frederick P. Willcox, Vestal, N. Y.

Original application December 16, 1944, Serial No. 568,429, now Patent No. 2,437,774, dated March 16, 1948. Divided and this application December 6, 1946, Serial No. 714,610

5 Claims. (Cl. 235—64.7)

This invention relates to photoelectric exposure meters, more particularly to improvements therein to provide single hand operation, including operation of the calculating dials, and to provide direct reading of exposure values. By "direct reading," I mean the reading of exposure times and diaphragm openings without the necessity for a mental transfer or calculation of a light value reading, as from a meter scale to a calculator disc.

The present application is a division of my co-pending application, Serial No. 568,429, filed December 16, 1944, now Patent No. 2,437,774, dated March 16, 1948. That application discloses and claims a type of photoelectric exposure meter in which a variable resistance element is utilized to vary the sensitivity of the meter element, and to achieve an extension of the range of brightnesses for which the meter is direct reading, the variable resistance element being controlled by one of the discs of a calculator dial combination to make the instrument direct reading. The advantages of such a construction are fully pointed out in that application.

The principal object of the invention covered by the present application is to provide, for use in combination with a photoelectric exposure meter, an arrangement of casing, dials and adjusting members which will enable easy and reliable one-hand setting and operation of the instrument. An ancillary object is to provide such a construction which will be physically rugged and not subject to damage during use, but which will at the same time be relatively simple and economical to manufacture. More specifically, it is an object of my present invention to provide a structure in which the single dial that is adjusted in accordance with the light value is especially designed for easy manipulation by the thumb of the hand which holds the meter, and this without subjecting said dial to danger of breakage, such as would be the case if said dial were merely extended beyond the periphery of the body of the meter.

Figure 1:
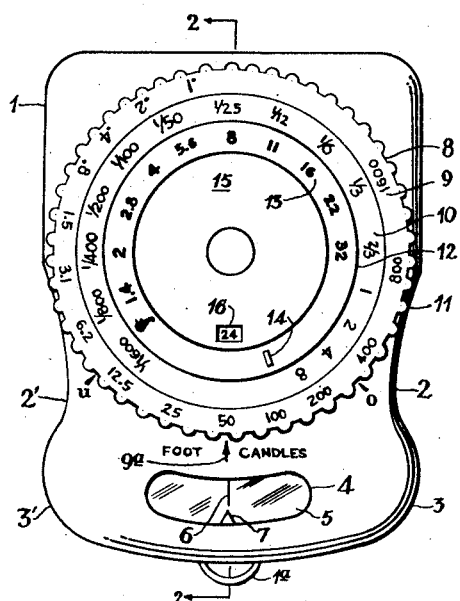
Figure 2:
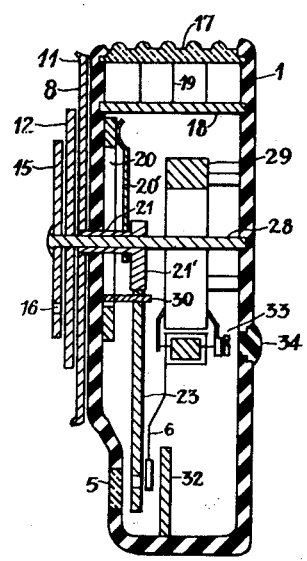
Figure 3:
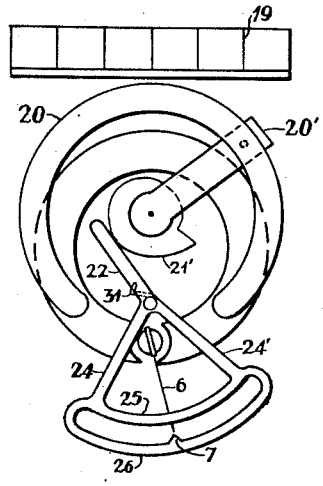
Figure 4:
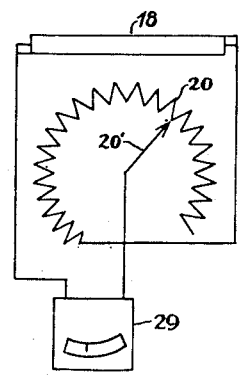

The above and other objects and advantages of my invention will best be understood in connection with a single specific embodiment thereof described below, reference being had to the accompanying drawings, of which Figure 1 is a plan view of an exposure meter constructed in accordance with my invention, Figure 2 is a sectional view thereof taken along the line 2—2 of Figure 1, Figure 3 is a diagrammatic view of certain of the internal parts, and Figure 4 is a wiring diagram of the connections between the electrical elements.

Referring now to Figure 1 of the drawings, numeral 1 designates the case of the exposure meter, which is provided with narrowed portions 2, 2' on opposite longitudinal sides thereof, and with rounded rear corners 3, 3'. In the top of the case 1, near the rear end, is an arcuate window 4, fitted with a transparent pane 5. Visible through this window is the meter needle 6 and a fiducial mark 7, the arrangement of which will be explained in greater detail below. A ring 1a for attaching a neck cord or the like, may be secured to case 1 at its rearward edge.

Mounted upon case 1 are the calculating discs 8, 12 and 15, discs 8 and 12 being arranged for rotational movement about their common center, and disc 15 being relatively fixed with respect to case 1.

It will be seen from Figure 1 that outer disc 8 has a serrated, upturned periphery 11, which extends just to the edge of case 1 at a point within each of the narrowed portions 2, 2'. This construction enables the user to adjust dial or disc 8 by means of the thumb of the hand which holds the meter, since the heel of the thumb will lie along the narrow portions 2, 2', with the fingers of the same hand obtaining a firm grasp of the meter by virtue of the other of the narrowed portions. The narrowed portions 2, 2' hence permit a positive grip of the instrument, regardless of the pressure with which it is held in the hand.

Disc 8 carries two concentric scales, a scale 9 of illumination values (foot-candles), and within that scale, a scale 10 of shutter speeds. Scale 9 cooperates with a fiducial mark 9a upon case 1. Scale 10, however, cooperates with a scale 13 of diaphragm openings (f-stops) carried by disc 12, which latter disc is relatively fixed in that it retains its position when disc 8 is adjusted, but which can be rotated by applying force to a struck-up finger 14. Innermost disc 15 is fixed with respect to case 1, but has a cut-out 16 through which is visible a selected one of a series of film speed indications carried by underlying disc 12.

I have found that it is advantageous to mark scales 10 and 13 upon their respective discs 8 and 12 in such a way as to provide a high visibility, for example by using white or bright numbers upon a dull background; I make scale 9, however, of relatively lower contrast with respect to its background. The purpose of this arrangement is to emphasize the most commonly read scales 10 and 13, to avoid confusing the operator with a multiplicity of scales all having the same visibility.

Referring now to Figure 2 of the drawings, and as more particularly described in the application referred to above, one end of case 1 is closed by a lenticulated plate 17, behind which, but separated therefrom by a baffle 19, is the photosensitive element 18. Within the case is an arcuately shaped resistor 20 whose contact arm 20' rotates with disc 8 through the intermediary of a bushing 21. The inner end of bushing 21 carries a cam 21' which cooperates with a cam follower arm 22 (Figure 3) which latter is integrally connected to a fan-shaped member 23 consisting of two arms 24, 24' carrying arcuate portions 25 and 26, the latter of which bears the fiducial mark or member 7 near its center. A shaft 28 passing through bushing 21 is fixedly mounted with respect to the case 1 and serves to secure disc 15 against rotation.

Within case 1 is also mounted the usual meter element 29, having a moving pointer 6. Meter 29 is so arranged that the end of pointer 6 travels in a path just below window 4. Arm 22 is pivotally mounted as at 30, and is so nearly coaxial with pointer 6 that its outer end, and fiducial member 7, travel nearly parallel over their normal movement range. A spring 31 serves to maintain arm 22 in contact with cam 21'. A background member 32 mounted within case 1 serves to render more visible, through window 4, the pointer 6 and mark 7.

Meter element 29 may be provided with the usual adjusting screw 33, accessible from outside the case by removal of a plug 34.

The operation of the exposure meter is very simple. First, the user adjusts disc 12, by means of projection 14, so that the emulsion speed which shows through window 16 corresponds to the film which he intends to use. He then aims the meter at the object or scene to be photographed, and by means of the thumb of that hand which holds the meter, whether right or left, he adjusts disc 8 to a point which just brings needle 6 into alignment with mark 7. When this has been done, the proper exposure (shutter speed) for any desired diaphragm opening may be read directly from scale 19, against the diaphragm markings of scale 13 on disc 12. All combinations of diaphragm opening and shutter speed which will give a correct exposure are obtained with the one adjustment.

The instrument may equally well be used to determine exposure by the highlight and shadow method, as fully described in my patent referred to above. In either event, it will be observed that the provision of recessed portions 2 and 2', and the location of main disc 8 with its upturned serrations 11 adjacent but not extending beyond such recessed portions, enable the main disc to be adjusted readily by the thumb of whichever hand is used to hold the instrument. At the same time, the serrated edge 11 of disc 8, and the disc itself, are protected against being struck accidentally, since they lie within the profile of the instrument case. Moreover, the inclination of the serrations to the plane of the disc enables the thumb to apply its turning pressure along a line directed into the body of the case 1, rather than across its face, whereby the turning pressure does not tend to turn the instrument up out of the user's grasp, as occurs in prior art meters.

I have described herein a particular specific form of my invention, but it is to be understood that there is considerable latitude in the design of mechanisms coming within the spirit of my invention. Hence, although specific terms have been employed, they are to be understood in an illustrative sense, and not for purposes of limitation. I intend to claim as my invention all such changes and modifications as come within the spirit of the appended claims.

I claim:

1. In a photoelectric exposure meter, a case of generally flat, rectangular shape having rounded rear corners, and with symmetrically disposed concavities on opposite longitudinal sides thereof, a plurality of discs mounted substantially centrally of one flat surface of said case, at least one of said discs having upturned serrations extending about its periphery and substantially tangent to the edges of said surface adjacent said concavities, said serrations being inclined to the surface of said case.

2. In an exposure meter, a housing, and a plurality of scale-bearing discs mounted upon said housing for relative movement, at least one of said discs having its periphery lying substantially tangent to an edge of said housing, and a series of serrations extending upwardly and outwardly from said periphery at an angle to the plane of said disc.

3. In an exposure meter of the type having a housing and a plurality of scale-bearing discs mounted thereupon with one of said discs having its periphery lying substantially tangent to an edge of said housing, the improvement which consists of a continuous series of serrations extending from the periphery of said disc and inclined at an angle to the plane of said disc, whereby said disc may readily be rotated by the thumb of a user, without loosening the grip upon said housing.

4. For use in combination with an exposure meter of the type having a calculator thereon, a calculator disc provided with a serrated peripheral portion, the serrations comprising such portion being inclined at an angle to the general plane of said disc.

5. In an exposure meter, a housing comprising opposed parallel major wall surfaces and edge wall portions extending therebetween, opposite edge wall portions being dished inwardly throughout the depth of said housing in regions lying predominately rearwardly of a central axis perpendicular to said major wall surfaces, a calculator disc rotatably mounted on one of said major wall surfaces with its center disposed forwardly of said axis, said disc being dimensioned so that its periphery is substantially tangent to the curvatures of said inwardly dished portions, and serrations on the periphery of said disc extending upwardly at an angle to the plane of said disc.

FREDERICK P. WILLCOX.

REFERENCES CITED

The following references are of record in the file of this patent:

UNITED STATES PATENTS

| Number | Name | Date |
|---|---|---|
| 459,532 | Johnson | Sept. 15, 1891 |
| 1,080,023 | Skinner | Dec. 2, 1913 |
| 1,214,262 | Bannihr | Jan. 30, 1917 |
| 2,064,987 | Reinhold et al. | Dec. 22, 1936 |
| 2,070,664 | Kuppenbender | Feb. 16, 1937 |
| 2,092,826 | Bernhard et al. | Sept. 14, 1937 |
| 2,178,197 | Bing | Oct. 31, 1939 |
| 2,268,105 | Bing | Dec. 30, 1941 |
| 2,338,703 | Chapman | Jan. 11, 1944 |
| 2,350,733 | Drotning | June 6, 1944 |
| 2,394,835 | Arant | Feb. 12, 1946 |
| 2,421,504 | Hickok | June 3, 1947 |

OTHER REFERENCES

Figures 947 and 948 on page 241 and 940 on page 239 of "Mechanical Movements" by Gardner D. Wilcox, 7th edition, published by Norman W. Henley and Co. 132 Nassau Street, New York, in 1901.